US010655699B2

(12) United States Patent
Keinänen et al.

(10) Patent No.: US 10,655,699 B2
(45) Date of Patent: May 19, 2020

(54) SELF-TUNED MASS DAMPER AND SYSTEM COMPRISING THE SAME

(71) Applicant: Teknologian tutkimuskeskus VTT Oy, Espoo (FI)

(72) Inventors: Jarkko Keinänen, Espoo (FI); Kalle Vehviläinen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 329 days.

(21) Appl. No.: 14/895,504

(22) PCT Filed: Jun. 2, 2014

(86) PCT No.: PCT/FI2014/050442
§ 371 (c)(1),
(2) Date: Dec. 3, 2015

(87) PCT Pub. No.: WO2014/195575
PCT Pub. Date: Dec. 11, 2014

(65) Prior Publication Data
US 2016/0123422 A1 May 5, 2016

(30) Foreign Application Priority Data
Jun. 3, 2013 (FI) .................................. 20135610

(51) Int. Cl.
*F16F 15/06* (2006.01)
*F16F 7/104* (2006.01)
(Continued)

(52) U.S. Cl.
CPC .............. *F16F 7/104* (2013.01); *F16F 7/116* (2013.01); *F16F 7/14* (2013.01)

(58) Field of Classification Search
CPC ............... F16F 7/14; F16F 7/116; F16F 7/104
See application file for complete search history.

(56) References Cited

U.S. PATENT DOCUMENTS

| 4,502,652 A * | 3/1985 | Breitbach | B64D 1/02 188/267 |
| 4,643,405 A * | 2/1987 | Hofmann | F16F 13/22 188/379 |

(Continued)

FOREIGN PATENT DOCUMENTS

| DE | 102004029792 A1 | 1/2005 |
| FI | 115555 B | 12/2004 |

(Continued)

OTHER PUBLICATIONS

Machine translation of DE 10 2004029792, retrieved Oct. 28, 2017 (Year: 2017).*

(Continued)

*Primary Examiner* — Bradley T King
(74) *Attorney, Agent, or Firm* — Laine IP Oy (57) ABSTRACT

A simple self-tuned mass damper is hereby proposed for a broadened frequency band and which can be adapted to large and expensive structures as well as small and inexpensive structures alike. The novel self-tuned mass damper includes an auxiliary mass and a non-linear suspension, which is configured to connect the auxiliary mass to a vibrating structure. The mass of the auxiliary mass and the stiffness of the non-linear suspension are selected such that the natural frequency is at least 6 Hz and that the amplitude of the relative displacement of the auxiliary mass in respect to the vibrating structure is at most 12 mm.

14 Claims, 14 Drawing Sheets

(51) Int. Cl.
*F16F 7/116* (2006.01)
*F16F 7/14* (2006.01)

(56) References Cited

U.S. PATENT DOCUMENTS

| | | | |
|---|---|---|---|
| 4,694,650 A * | 9/1987 | Vincent | F02G 1/04 188/380 |
| 4,955,578 A * | 9/1990 | Fidi | H04R 1/08 188/380 |
| 6,530,563 B1 | 3/2003 | Miller et al. | |
| 7,980,536 B2 * | 7/2011 | Haregoppa | B06B 3/00 188/378 |
| 2006/0086582 A1 * | 4/2006 | Spyche, Jr. | E04H 9/02 188/378 |
| 2008/0259545 A1 | 10/2008 | Park et al. | |
| 2011/0297489 A1 * | 12/2011 | Blanchard | B66B 7/08 187/411 |

FOREIGN PATENT DOCUMENTS

| | | |
|---|---|---|
| GB | 2052328 A | 1/1981 |
| JP | H0989043 A | 3/1997 |
| JP | 2003042227 A | 2/2003 |
| JP | 2004301284 A | 10/2004 |
| SU | 1634860 A1 | 3/1991 |

OTHER PUBLICATIONS

Machine translation of JP 2003-042227, retrieved Sep. 12, 2019 (Year: 2019).*

Rafik R. Gerges et al: Parametric experimental study of wore rope spring tuned mass dampers. JOWEAIA. vol. 91. No. 12-15. Nov. 13, 2003.

* cited by examiner

SELF-TUNED MASS DAMPER AND SYSTEM COMPRISING THE SAME

TECHNICAL FIELD

The present invention relates to tuned mass dampers

BACKGROUND ART

Tuned mass dampers are a well known solution to reducing the amplitude of unnecessary or harmful mechanical harmonic vibrations. Tuned mass dampers are used to dampen vibrations of a large scale from microcircuits to tall sky scrapers. The basic idea behind a tuned mass damper is simple: an auxiliary mass is attached to the vibrating structure via a suspension element, which typically consists of a spring and a damper, thus changing the vibrating characteristics of the vibrating structure. Instead of a spring and a damper, the suspension element may be alternatively provided by means of only one element, e.g. a rubber spring which contains both needed properties.

The mass damper is tuned to the vibrating structure such that the mass of the auxiliary mass and the stiffness of the suspension element are selected to provide an appropriate counterforce to the disturbing excitation force. In particular, the mass ratio, i.e. the relativity of mass between the auxiliary mass and the vibrating structure, and the tuning frequency of the mass damper are calculated according to well known design principles.

While tuned mass dampers are typically linear, also non-linear mass dampers have been proposed by several publications because non-linear mass dampers work on a wider frequency band. Non-linear tuned mass dampers employ a non-linear spring and/or a non-linear damper and mass. One particular type of non-linear mass dampers is a wire rope spring damper, the principles of which have been disclosed in e.g. 'Parametric experimental study of wire rope spring tuned mass dampers' Gerges & Vickery in the Journal of Wind Engineering and Industrial Aerodynamics (91, 2003, 1363-1385). According to Gerges & Vickery, the studied frequency area of the resulting structure is at most 4.5 Hz.

An issue associated with conventional tuned mass dampers is that they are and can only be tuned to a rather narrow frequency band. The operational window of a conventional tuned mass damper is dictated by the dampening construction in that the width of the frequency band is a trade-off between high dampening efficiency and width of the frequency band. More particularly, an increase in dampening efficiency typically leads to reduced frequency band, whereas widening the frequency band tends to make the dampening less optimal for a specific frequency within the band. There have been many attempts to broaden the frequency band of mass dampers. Many proposals involve the use of active or adaptive mass dampers which employ a controlling unit regulating a series of actuators which adapt the mass damper to dampen a desired frequency. Otherwise, such active mass dampers are designed similarly to passive dampers in terms of providing a counter mass via a suspension to the vibrating structure. Unfortunately, conventional active mass dampers use excessive energy and are rather complex and therefore not feasible to dampen small and inexpensive structures such as microcircuit boards.

It is therefore an aim of the present invention to provide a simple tuned mass damper which has a broadened frequency band and which can be adapted to large and expensive structures as well as small and inexpensive structures alike.

SUMMARY

The aim of the present invention is achieved with aid of a novel and completely unorthodox manner of providing a self-tuned mass damper including an auxiliary mass and a non-linear suspension, which is configured to connect the auxiliary mass to a vibrating structure. The mass of the auxiliary mass and the stiffness of the non-linear suspension are selected such that the natural frequency is at least 6 Hz and that the amplitude of the relative displacement of the auxiliary mass in respect to the vibrating structure is at most 12 mm.

Considerable benefits are gained with aid of the present invention. Because the mass damper is dimensioned outside typical specification, a broadened frequency band is achieved with a very simple and capable to be adapted to large and expensive structures as well as small and inexpensive structures alike.

BRIEF DESCRIPTION OF DRAWINGS

In the following, exemplary embodiments of the invention are described in greater detail with reference to the accompanying drawings in which.

DETAILED DESCRIPTION OF EXEMPLARY EMBODIMENTS

Figure 1:
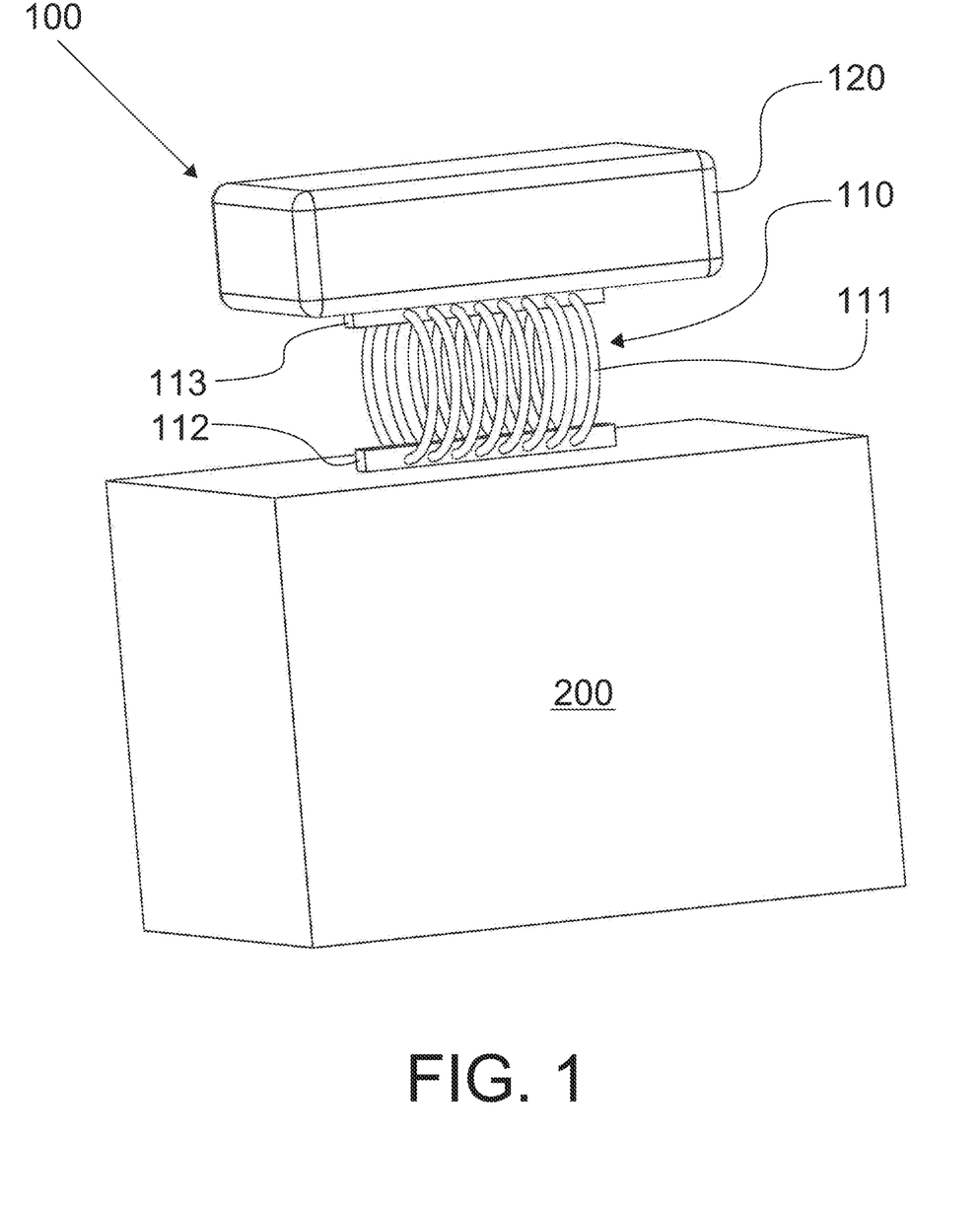
FIG. 1 presents an isometric view of a tuned mass damper arrangement according to one embodiment of the invention.

As shown in FIG. 1, a tuned mass damper 100 arrangement according to one embodiment features an auxiliary mass 120 which is attached to a vibrating structure 200 via a wire rope isolator 110. The wire rope isolator 110 includes a wound wire which is attached to the auxiliary mass 120 and to the vibrating structure 200 by means of attachment blocks 113, 112, respectively. In this context, the term wire rope isolator is meant to refer to a structure which are also known in the field by the expression cable mount, cable isolator and/or wire rope spring. Wire rope isolator may be built many ways, e.g. by employing helical, compact, short bar or specially assemblies. All different wire rope isolator types still work in same way as a self-adapting mass damper.

Figure 2:
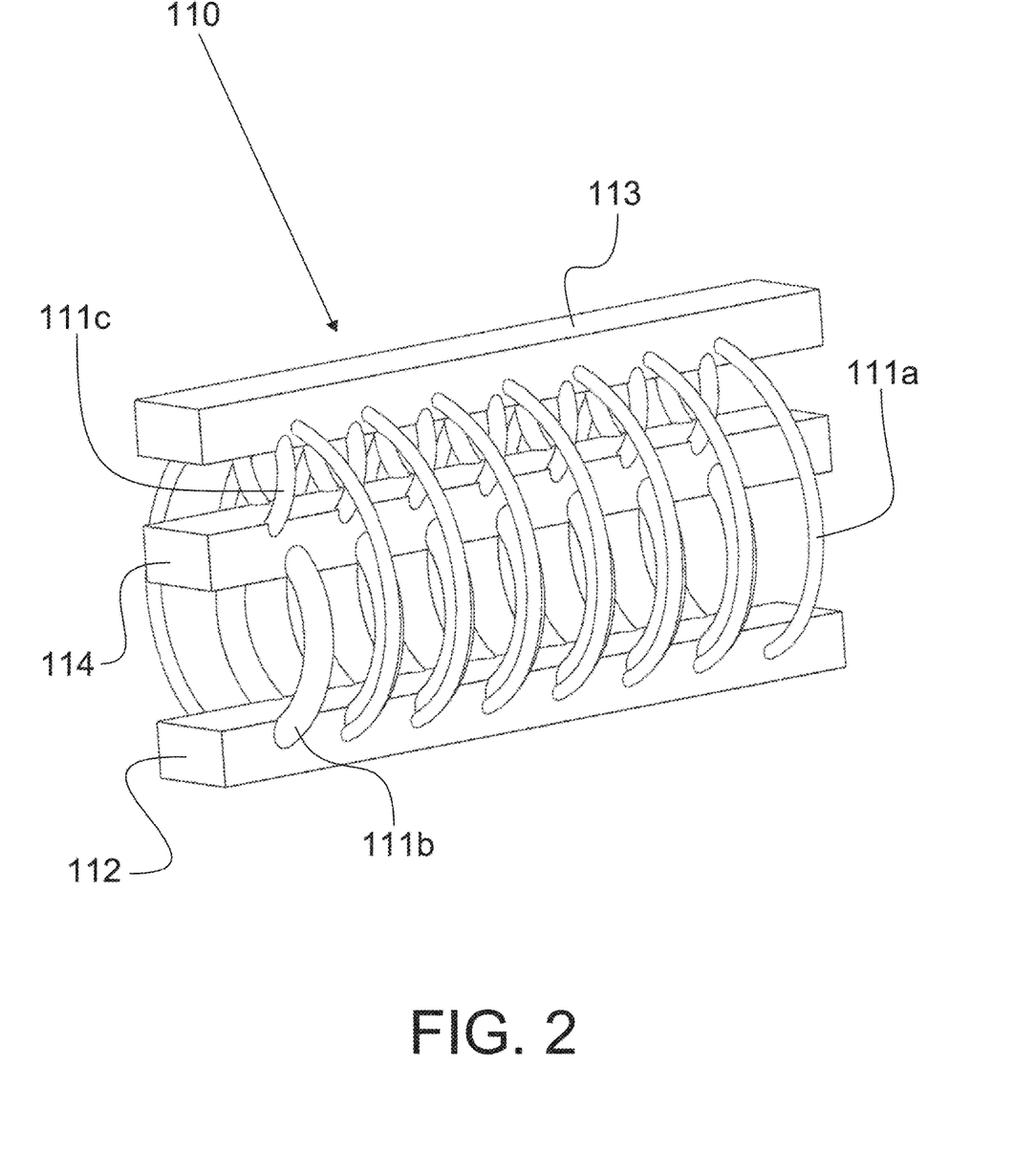
FIG. 2 presents an isometric view of a tuned mass damper arrangement according to another embodiment of the invention.
Figure 3:
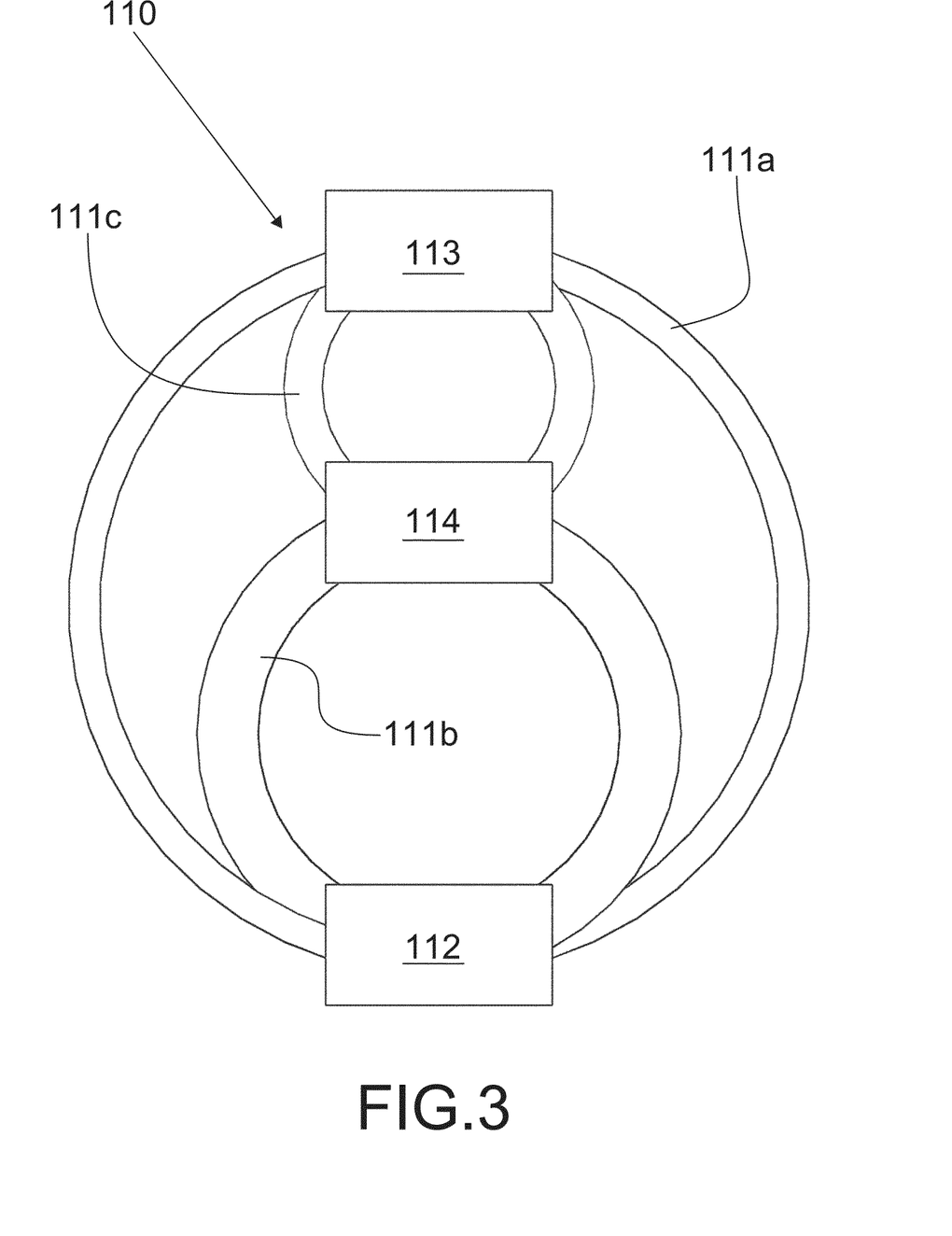
FIG. 3 presents a side elevation view of the arrangement of FIG. 2.

FIGS. 2 and 3 show a tuned mass damper arrangement according to another embodiment.

In this second embodiment, the mass damper 110 of FIG. 1 has been provided with an additional intermediate block 114 between the attachment blocks 112, 113. The attachment blocks 112, 113 are in this embodiment joined by a large helical spring wire 112a, whereas the intermediate block 114 is coupled to the attachment blocks 112, 113 via nested small helical spring wires 111b, 111c, respectively. By using an intermediate block 114 with nesting spring wires 111b, 111c connecting the intermediate block 114 to the attachment blocks 112, 113, the resulting tuned mass damper 110 provides better control for the damping and stiffness.

Figure 4:
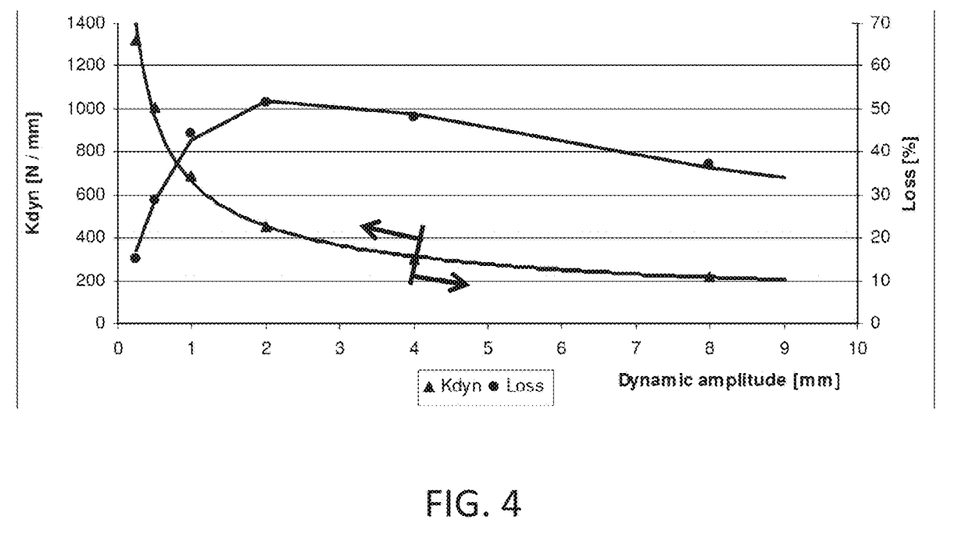
FIG. 4 presents a graph showing the relation between the dynamic amplitude plotted on the horizontal axis, dynamic stiffness plotted on the left vertical axis and loss factor, i.e. damping property, plotted on the right vertical axis.
Figure 5:
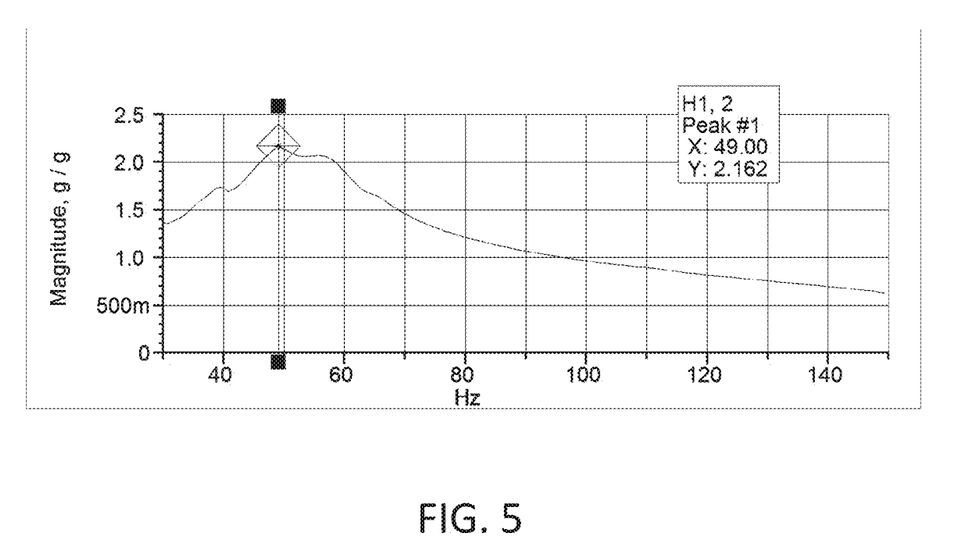
FIG. 5 presents a graph showing the frequency response function of a spring-mass system according to FIG. 1 using 2.5 g as the excitation amplitude level.
Figure 6:
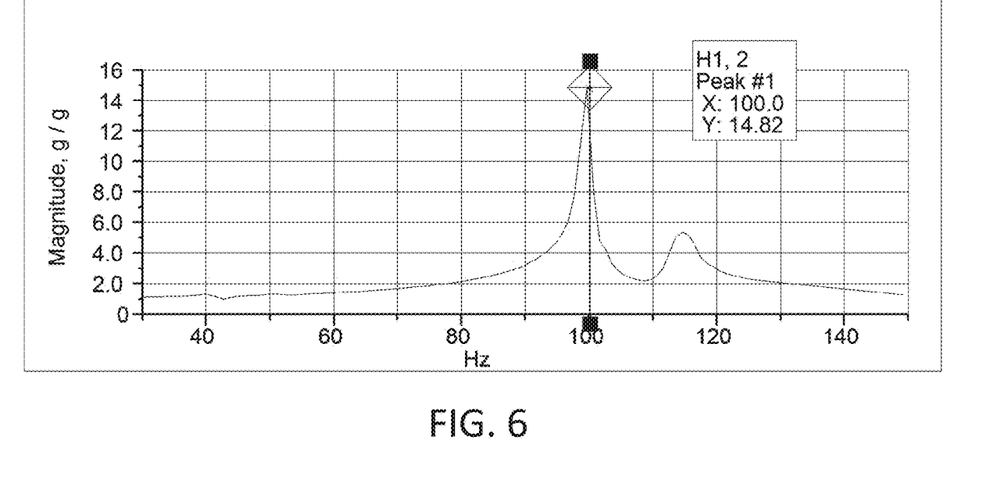
FIG. 6 presents a graph showing the frequency response function of a spring-mass system according to FIG. 1 using 0.3 g as the excitation amplitude level.
Figure 7:
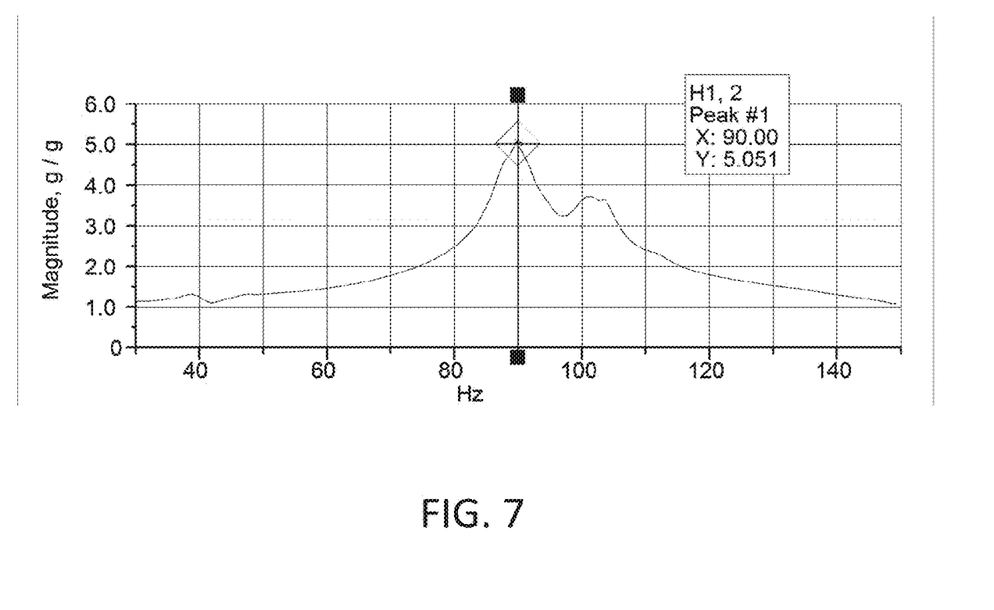
FIG. 7 presents a graph showing the frequency response function of a spring-mass system according to FIG. 1 using 0.5 g as the excitation amplitude level.
Figure 8:
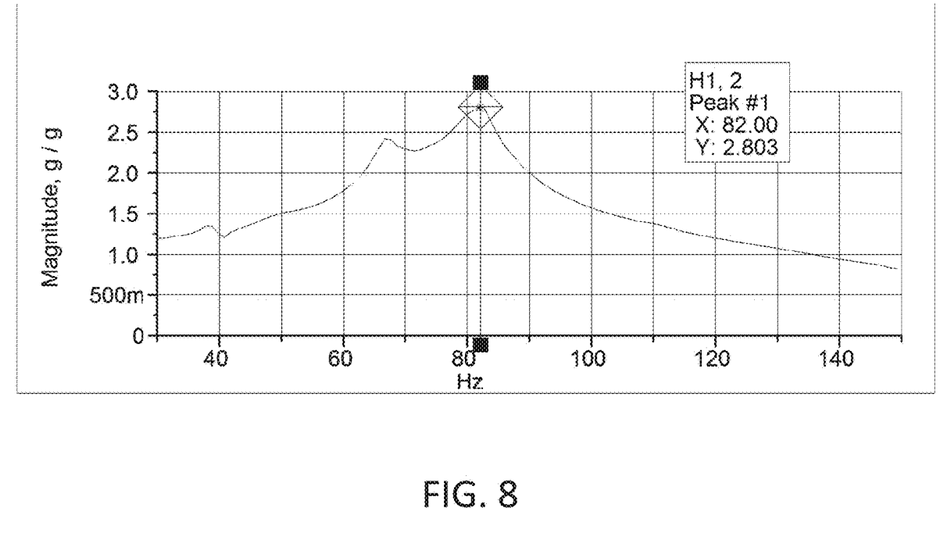
FIG. 8 presents a graph showing the frequency response function of a spring-mass system according to FIG. 1 using 1 g as the excitation amplitude level.
Figure 9:
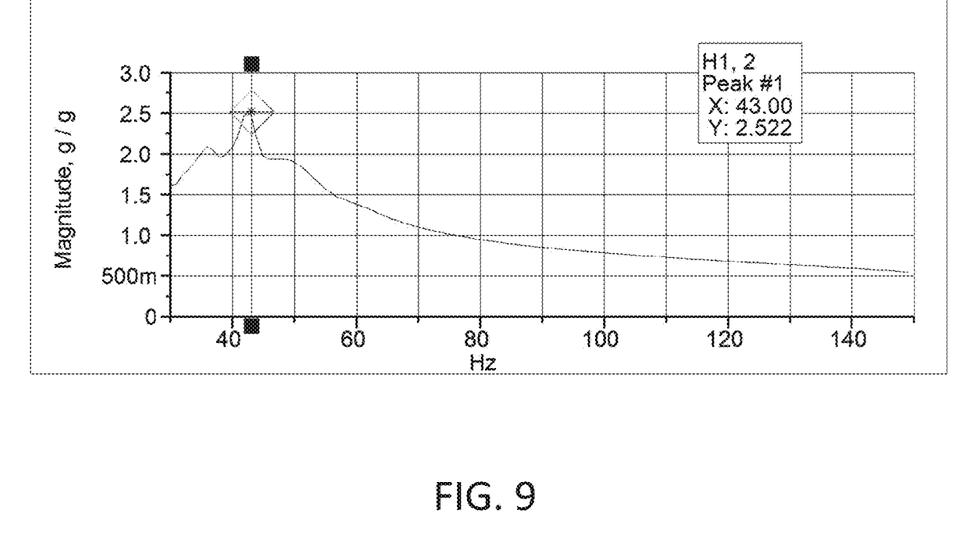
FIG. 9 presents a graph showing the frequency response function of a spring-mass system according to FIG. 1 using 4 g as the excitation amplitude level.

Turning now to FIG. 4 which shows a graph illustrating an exemplary relation between the dynamic amplitude, which is plotted on the horizontal axis, dynamic stiffness, which is plotted on the left vertical axis, and loss factor, which is also known as damping property, which is plotted on the right vertical axis. The illustrated example is the result of a particular mass damper structure, where the wire diameter is 12 mm and height 122 mm and width 144 mm. The structure of the mass damper has an effect on the amplitude-stiffness curve. The most useful non-linear area of wire rope isolator can be estimated using slope of the amplitude-stiffness curve as presented in FIG. 4. While the slope approaches value 1, the wire rope isolator is close to linear spring-damper such as a rubber or helical steel spring for example and the self-tuning property of the mass damper is lost. The rule of thumb is that the self-tuning mass damper works better while the slope of the amplitude-stiffness curve is closer to a second or higher order function than linear equation. This principle is illustrated in FIG. 4, where the linear equation is starting from 4 mm and where a closer to second order function is seen with less than 4 mm amplitude. The linear equation in slope of the amplitude-stiffness curve is still non-linear spring, but the effect is lesser compared to second order function in the slope. The dependence of displacement to acceleration amplitude in frequency domain is second order function and often structures vibration acceleration amplitudes are higher with higher frequencies so the non-linear spring needs to be as non-linear as possible to work in wide frequency area. The linear equation of slope in the amplitude-stiffness curve also gives wider operation area in frequency domain compared to conventional tuned mass damper which works only in narrow frequency band.

It may therefore be concluded that for providing a self-tuned mass damper in the illustrated example, the mass of the auxiliary mass 120 and the stiffness of the non-linear suspension 110 should selected such that the said natural frequency is e.g. at least 6 Hz and that the amplitude of the relative displacement of the auxiliary mass 200 in respect to the vibrating structure is e.g. at most 4 mm. The resulting stiffness to mass ratio would then be at least 1.4 kN/(m·kg) by using static stiffness.

Figure 14:
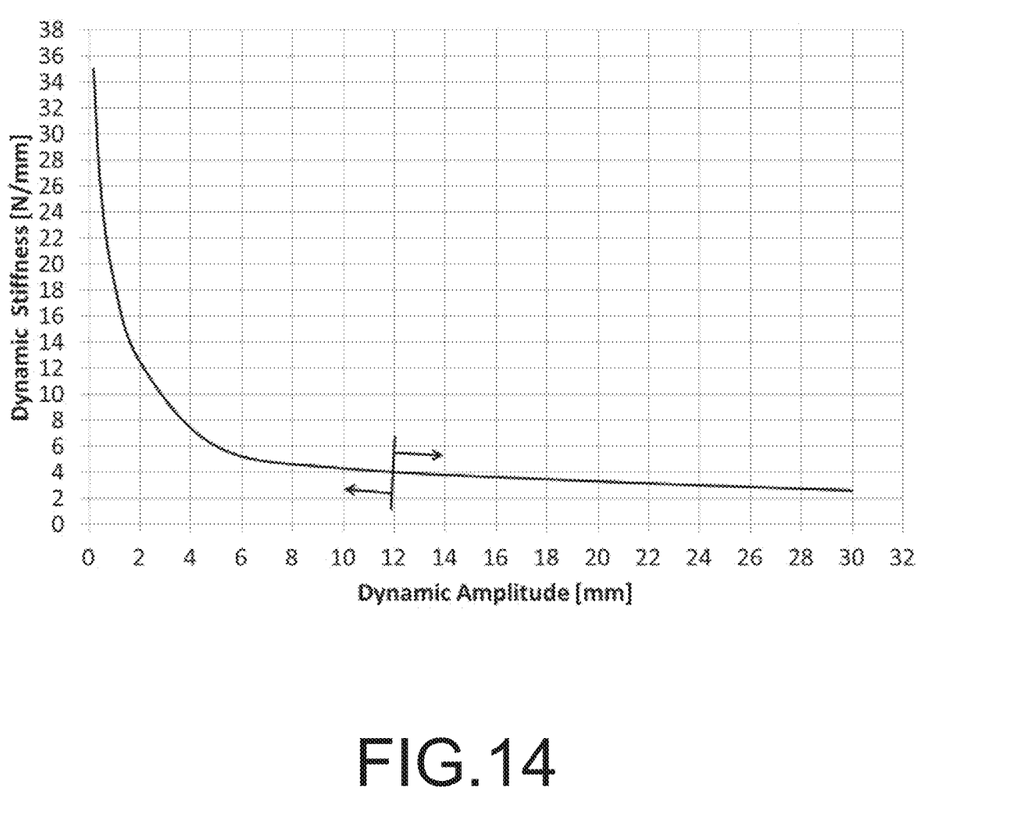
FIG. 14 presents a graph showing the relation between dynamic amplitude, which is plotted on the horizontal axis, and dynamic stiffness, which is plotted on the left vertical axis, in an example concerning a wire rope isolator, the height of which is 130 and width 145 mm with a wire diameter of 6 mm and 4 turns.

Another example is depicted here after with reference to FIG. 14.

According to further embodiment, the natural frequency is at least 10 Hz thus yielding stiffness to mass ratio of at least 4 kN/(m·kg) by using static stiffness. According to an even more further embodiment, the natural frequency is at least 14 Hz thus yielding stiffness to mass ratio of at least 7 kN/(m·kg) by using static stiffness.

Turning now to FIGS. 5 to 9, which show graphs depicting the frequency response function of a spring-mass system according to the embodiment shown FIG. 1, when using exemplary excitation amplitude levels, namely 2.5 g, 0.3 g, 0.5 g, 1 g and 4 g, respectively. As can be seen from these graphs, response/excitation ratio is above 1 in wide frequency range.

Next, the design principles of the novel mass damper are described in greater detail by referring to three design examples.

Figure 10:
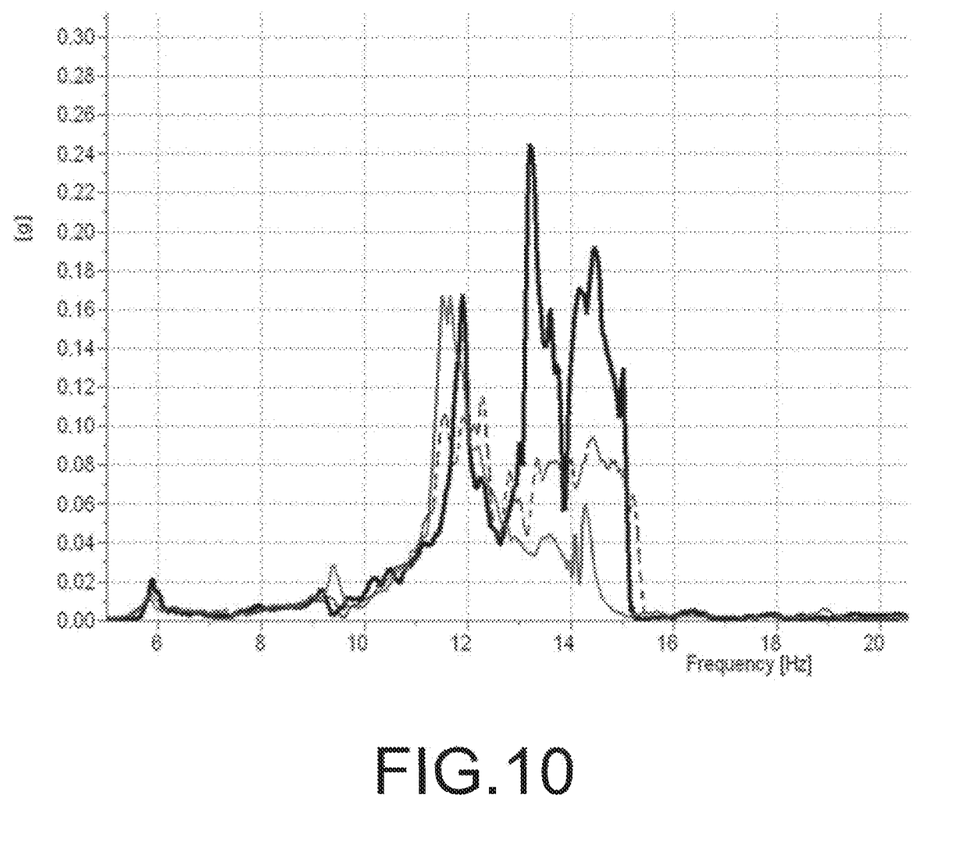
FIG. 10 presents a graph showing the vibration of a structure with modal mass of 200 kg in frequency domain.

Turning first to FIG. 10, which shows a graph depicting the vibration of a structure with modal mass of 200 kg in frequency domain. The thick line is the original structure without any dampers, thin line is a same structure with conventional tuned mass damper and dashed line is a structure with self-tuned mass damper. In FIG. 10, it may be seen a structure with three resonances illustrated by the thick line in frequency domain. The vibration acceleration [g] is presented in vertical axle and frequency [Hz] in horizontal axle. The thin line presents same structure with conventional tuned mass damper which reduces the vibration of two resonances seen in 13 and 14.5 Hz, but it does not have an effect to first resonance near 12 Hz. The dashed line presents same structure with self-tuning mass damper which is able to reduce all resonances.

Figure 11A:
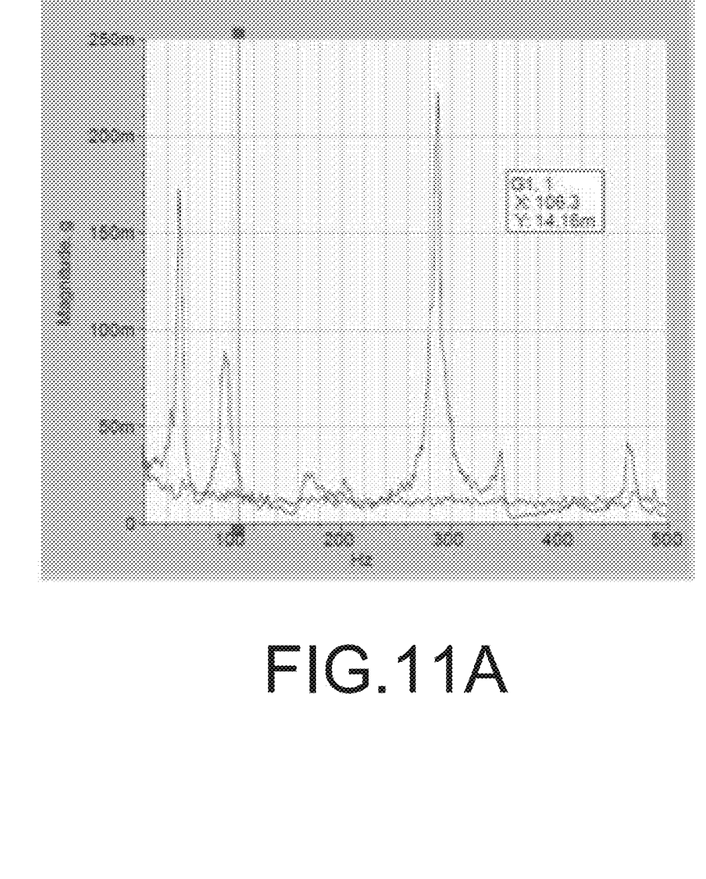
FIG. 11A presents a graph showing the vibration of a circuit board without a self-tuned mass damper in frequency domain.
Figure 11B:
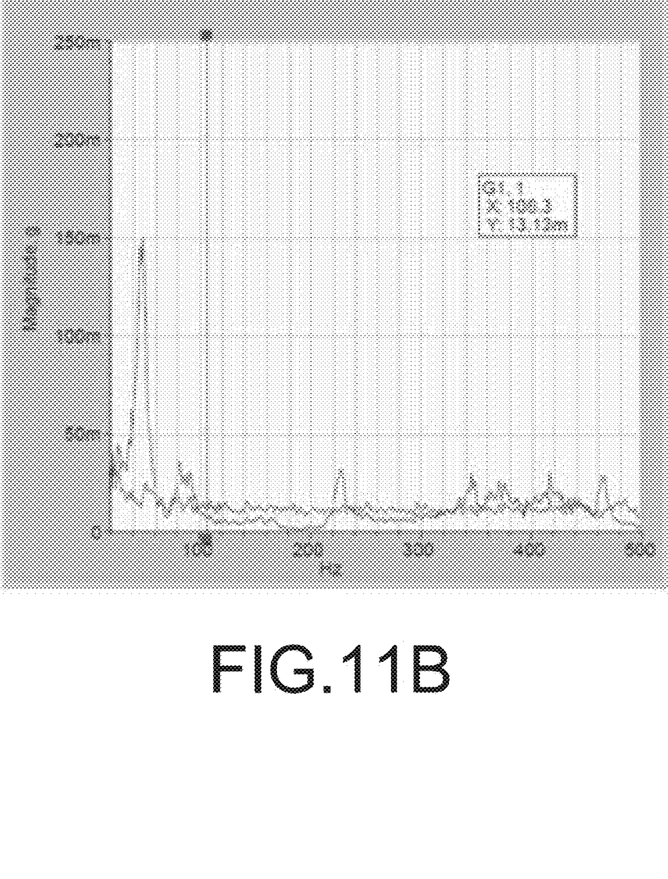
FIG. 11B presents a graph showing the vibration of a circuit board with a self-tuned mass damper in frequency domain.

Another example of the mass damper is shown in FIGS. 11A and 11B, wherein the damper is used to dampen vibrations occurring in a much smaller vibrating structure: a circuit board. The circuit board was dynamically tested with an electro-magnetic shaker using wide frequency noise excitation. Many resonances where discovered in the circuit board (see FIG. 11A). The self-tuning mass damper was installed in the middle of the circuit board and tested with same excitation (see FIG. 11B). The self-tuning mass damper was able to decrease many resonances e.g. near 90, 290 and 460 Hz.

Figure 12:
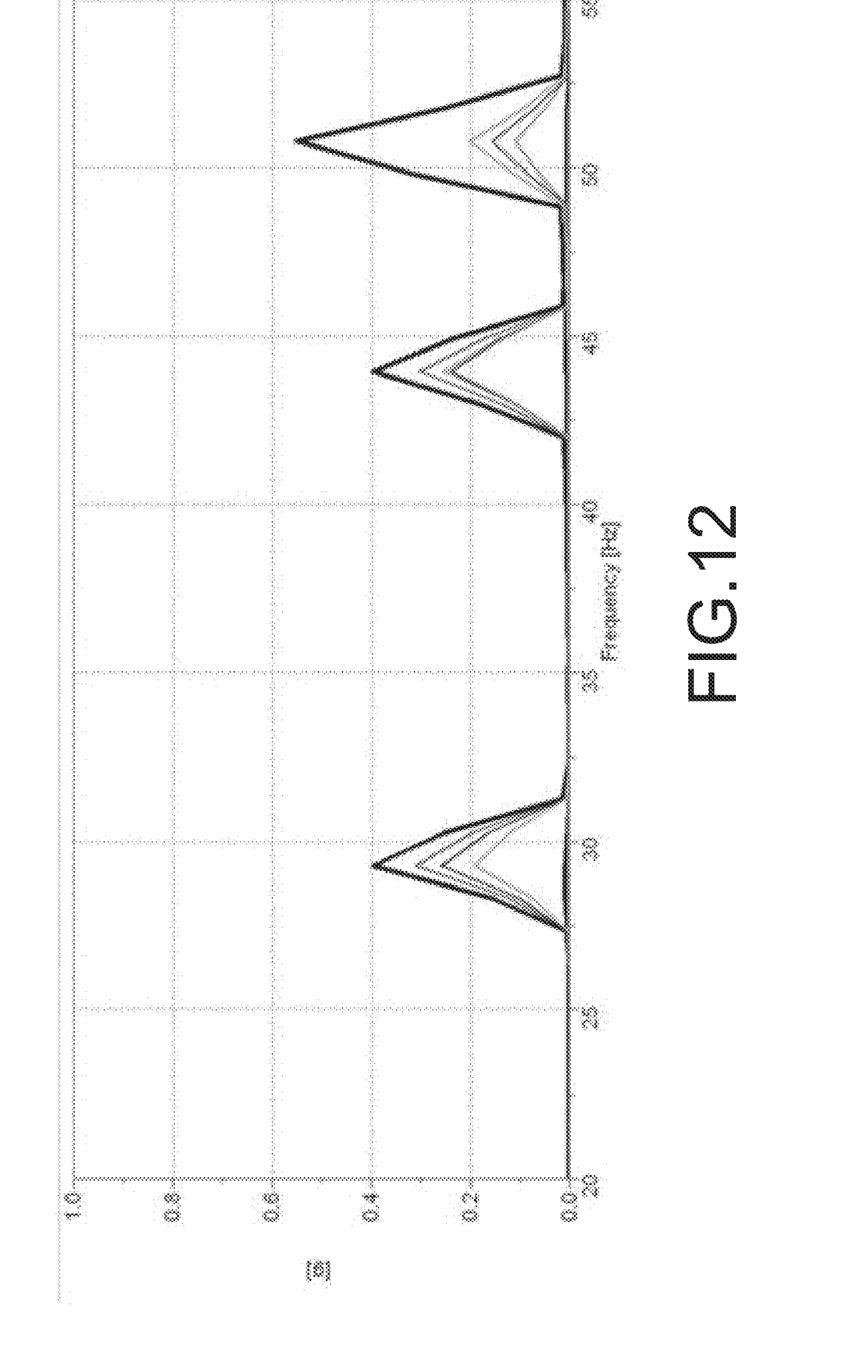
FIG. 12 presents a graph showing the vibration of a structure with modal mass of 900 kg in frequency domain.
Figure 13:
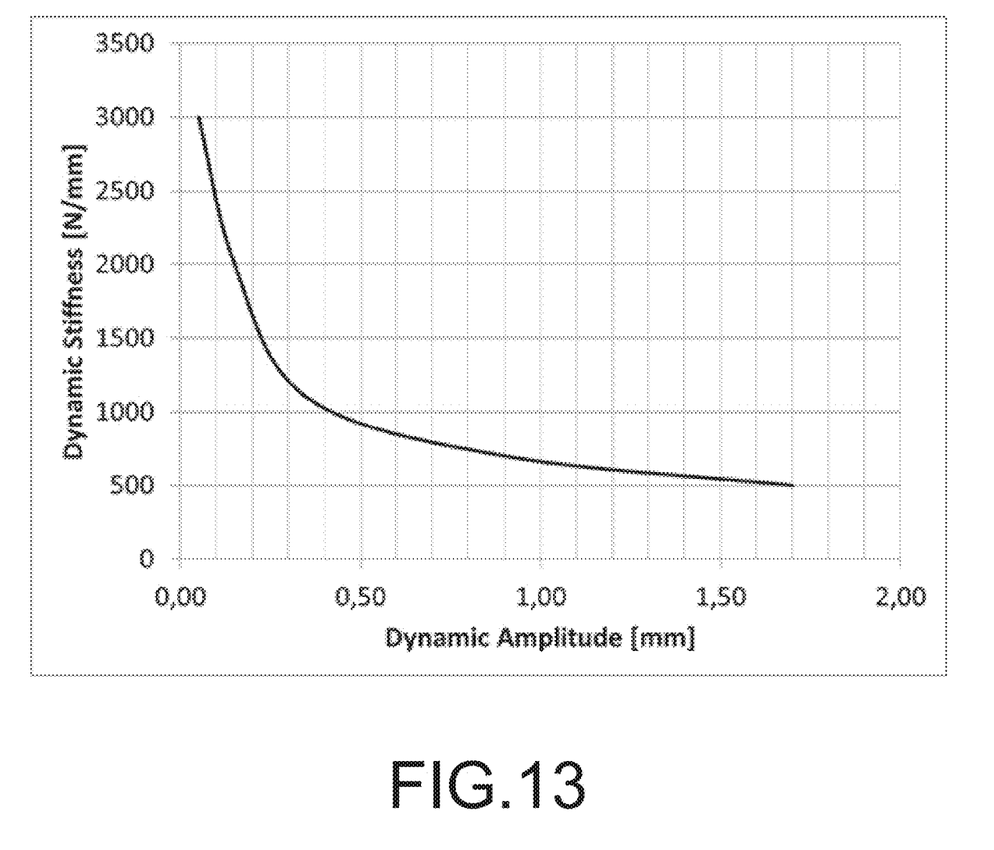
FIG. 13 presents a graph showing the relation between the dynamic amplitude plotted on the horizontal axis, dynamic stiffness plotted on the left vertical axis of the example of FIG. 12.

A third example is shown by reference to FIGS. 12 and 13, which presents a graph showing the vibration of a structure with modal mass of 900 kg in frequency domain. A self-tuning mass damper was tested dynamically with resonance table there modal mass was 900 kg (plane table without mass damper thick line in FIG. 12). The self-tuning mass damper was tested using moving auxiliary mass of 40, 60 and 80 Kg (thin lines). From the FIG. 12 it may be seen that the self-tuning mass damper was able to reduce the vibration levels of the resonance test table in all three resonances (near 29, 44 and 51 Hz). A wire rope isolator that was used in this test was made using 16 mm steel wire rope with 8 turns, length of the frame was 267 mm, the height of the isolator was 109 mm and width 135 mm.

Amplitude-stiffness curve of the wire rope isolator that was used in resonance table test is presented in FIG. 13. From the FIG. 13 can be calculated the natural frequency of the self-tuning mass damper and compared to results of the resonance table test results presented in FIG. 12. The calculation results are presented in Table 1 below. The movement of the self-tuning mass damper was three to four times greater compared to movement of the damped resonance table.

TABLE 1

CALCULATION RESULTS EXAMPLE.

| Structure vibration | | | Mass damper movement | | | Self-tuning mass damper | | |
|---|---|---|---|---|---|---|---|---|
| acc [g] | X [mm] | f [Hz] | acc [g] | X [mm] | f [Hz] | k [N/m] | m [kg] | f [Hz] |
| 0.1 | 0.010 | 51 | 0.4 | 0.039 | 51 | 3500000 | 40 | 47 |
| 0.3 | 0.039 | 44 | 0.9 | 0.118 | 44 | 2500000 | 40 | 40 |
| 0.3 | 0.090 | 29 | 0.9 | 0.271 | 29 | 1200000 | 40 | 28 |

As explained above, the dimensioning values given with reference to the example of FIG. 4 may vary depending on the structure of the mass damper. Accordingly, another example with a higher amplitude of the relative displacement of the auxiliary mass in respect to the vibrating structure is given here after.

Turning now to FIG. 14 which shows a graph illustrating the relation between the dynamic amplitude, which is plotted on the horizontal axis, dynamic stiffness, which is plotted on the left vertical axis. The most useful non-linear area of a wire rope isolator can be estimated using the slope of the amplitude-stiffness curve as presented in FIG. 14. While the slope approaches value 1, the wire rope isolator is close to a linear spring damper such as a rubber or helical steel spring for example and the self-tuning property of the mass damper is lost. The rule of thumb is that the self-tuning mass damper works better while the slope of the amplitude-stiffness curve is closer to a second or higher order function than linear equation. This principle is illustrated in FIG. 14, where the linear equation is starting from 12 mm and where a closer to second order function is seen with less than 12 mm amplitude. The linear equation in the slope of the amplitude stiffness curve is still a non-linear spring, but the effect is lesser compared to second order function in the slope. The dependence of displacement to acceleration amplitude in frequency domain is a second order function. The vibration acceleration amplitude of a structure is often higher with higher frequencies, whereby a non-linear spring needs to be as non-linear as possible to work in a wide frequency area. The linear equation of slope in the amplitude-stiffness curve also gives a wider operation area in frequency domain compared to a conventional tuned mass damper, which works only in narrow frequency band.

The difference between the examples of FIG. 4 and FIG. 14 is the wire diameter compared to height and width of the wire rope isolator. There therefore exists a particular amplitude value, where non-linear stiffness increases, while the wire diameter versus height and width of the wire rope isolators is decreased. This means that with a small wire diameter compared to a relatively large height and width of the wire rope isolator the non-linear stiffness part is relatively high in amplitude: e.g. 12 mm with FIG. 14 example, where the wire diameter is 6 mm, height 130 mm and width 145 mm, but only 4 mm with FIG. 4 example, where the wire diameter is 12 mm and height 122 mm and width 144 mm.

TABLE 2

LIST OF REFERENCE NUMBERS.

| Number | Part |
|---|---|
| 100 | tuned mass damper |
| 110 | wire rope isolator |
| 111 | wire |
| 112 | attachment block |
| 113 | attachment block |
| 114 | intermediate block |
| 120 | auxiliary mass |

The invention claimed is:

1. A self-tuned mass damper comprising:
an auxiliary mass and
a wire rope isolator acting as a non-linear suspension, which is configured to connect the auxiliary mass to a vibrating structure,
wherein:
the mass of the auxiliary mass and the stiffness of the non-linear suspension are configured to yield an appropriate natural frequency for the resulting structure,
the mass of the auxiliary mass and the stiffness of the non-linear suspension are selected such that said natural frequency is at least 10 Hz and that the amplitude of the relative displacement of the auxiliary mass in respect to the vibrating structure is at most 4 mm, and the stiffness to mass ratio is at least 4 kN/(m·kg) using static stiffness.

2. The self-tuned mass damper according to claim 1, wherein said natural frequency is at least 14 Hz.

3. The self-tuned tuned-mass damper according to claim 2, wherein the stiffness to mass ratio is at least 7 kN/(m·kg) using static stiffness.

4. The self-tuned mass damper according to claim 1, wherein the amplitude of the relative displacement of the auxiliary mass in respect to the vibrating structure is at most 2 mm.

5. The self-tuned mass damper according to claim 1, wherein the amplitude of the relative displacement of the auxiliary mass in respect to the vibrating structure is at most 1 mm.

6. The self-tuned mass damper according to claim 1, wherein the auxiliary mass is in the range of 40 to 80 kg.

7. The self-tuned mass damper according to claim 1, wherein the stiffness of the wire rope isolator has been selected to be in the slope of the amplitude-stiffness curve of the wire rope isolator that is closer to a second or higher order function than a linear equation.

8. The self-tuned mass damper according to claim 1, wherein the stiffness of the wire rope isolator, in conjunction with the other properties of the self-tuned mass damper, has been selected to be in the slope of the amplitude-stiffness curve of the wire rope isolator that is closer to a second or higher order function than a linear equation.

9. The self-tuned mass damper according to claim 1, wherein the wire rope isolator has been selected such that, at the maximum relative displacement of the auxiliary mass, the derivative of the amplitude-stiffness curve of the wire rope isolator is greater than 1.

10. The self-tuned mass damper according to claim 1, wherein the wire rope isolator has been selected such that, in conjunction with the other properties of the self-tuned mass damper, at the maximum relative displacement of the auxiliary mass, the derivative of the amplitude-stiffness curve of the wire rope isolator is greater than 1.

11. A vibrating system comprising:
   a vibrating structure and
   a self-tuned mass damper, which includes:
      an auxiliary mass and
      a non-linear suspension, formed by a wire rope isolator, which is configured to connect the auxiliary mass to the vibrating structure,
   wherein:
      the mass of the auxiliary mass and the stiffness of the non-linear suspension are configured to yield an appropriate natural frequency for the resulting structure, and wherein
      said mass of the auxiliary mass and the stiffness of the non-linear suspension are selected such that:
         said natural frequency is at least 10 Hz and that
         the amplitude of the relative displacement of the auxiliary mass in respect to the vibrating structure is at most 4 mm
            wherein the mass damper is self-tuned and wherein the stiffness to mass ratio is at least 4 kN/(m·kg) using static stiffness.

12. The vibrating system according to claim 11, wherein the auxiliary mass is in the range of 40 to 80 kg.

13. The vibrating system according to claim 11, wherein the stiffness of the wire rope isolator has been selected to be in the slope of the amplitude-stiffness curve of the wire rope isolator that is closer to a second or higher order function than a linear equation.

14. A self-tuned mass damper comprising:
   an auxiliary mass and
   a wire rope isolator acting as a non-linear suspension, which is configured to connect the auxiliary mass to a vibrating structure,
   wherein:
      the mass of the auxiliary mass and the stiffness of the non-linear suspension are configured to yield an appropriate natural frequency for the resulting structure,
      the mass of the auxiliary mass and the stiffness of the non-linear suspension are selected such that said natural frequency is at least 10 Hz and that the amplitude of the relative displacement of the auxiliary mass in respect to the vibrating structure is at most 4 mm under normal loading, and the stiffness to mass ratio is at least 4 kN/(m·kg) using static stiffness.

* * * * *